(12) United States Patent
Bharucha et al.

(10) Patent No.: US 7,650,301 B2
(45) Date of Patent: Jan. 19, 2010

(54) SYSTEM AND METHOD FOR MONITORING ACQUISITION CHANNELS

(75) Inventors: Burges Bharucha, Pyrmont (AU); Julie Bowers, Brighton (GB); Jeffrey John Newton, Surry Hills (AU); Alexandra Schmidt, Brighton (GB); Ram Chandran Viswanathan, Cherrybrook (AU); Riththidej Vuwong, Kingsford (AU)

(73) Assignee: American Express Travel Related Services Company, Inc., New York, NY (US)

( * ) Notice: Subject to any disclaimer, the term of this patent is extended or adjusted under 35 U.S.C. 154(b) by 138 days.

(21) Appl. No.: 11/850,406

(22) Filed: Sep. 5, 2007

(65) Prior Publication Data

US 2009/0063319 A1 Mar. 5, 2009

(51) Int. Cl.
*G06Q 40/00* (2006.01)
(52) U.S. Cl. .............................. 705/35; 705/39; 705/38; 707/101; 235/379; 709/219
(58) Field of Classification Search ............. 705/38–39, 705/35; 707/101; 235/379; 709/219
See application file for complete search history.

(56) References Cited

U.S. PATENT DOCUMENTS

2003/0101112 A1 5/2003 Gallagher et al.
2003/0144866 A1 7/2003 Pagliari et al.
2004/0024693 A1 2/2004 Lawrence
2005/0187862 A1* 8/2005 Dheer et al. ................... 705/39
2006/0259471 A1 11/2006 Droubie et al.
2007/0011015 A1* 1/2007 Alkalay ......................... 705/1
2008/0288392 A1* 11/2008 Sgaraglio et al. .............. 705/38

OTHER PUBLICATIONS

ISR & Written Opinion mailed Nov. 4, 2008 in Serial No. PCT/US08/73889.

* cited by examiner

*Primary Examiner*—Harish T. Dass
(74) *Attorney, Agent, or Firm*—Snell & Wilmer L.L.P.

(57) ABSTRACT

To ensure merchant acquisition compliance, the invention enables creation of merchant selection criteria that are used to query a database of acquired merchants. A set of acquired merchants is randomly compiled based on the selection criteria and is entered into a workflow to determine compliance with a set of rules that are represented by a checklist. A checklist corresponding to the set of acquired merchants is retrieved. The set and the checklist are combined to create a case, which is assigned to a representative. The representative ensures that a merchant acquisition form for each merchant in the set complies with a checklist item. When a merchant acquisition form is found to be non-compliant, then it is either corrected by the representative (if the error is minor), or sent to an acquisition manager (when more substantive errors are found). The acquisition form is then corrected and the case is closed.

25 Claims, 7 Drawing Sheets

| Select Report | | |
|---|---|---|
| Report | Overdue errors (R 6) ▼ | 705 |
| Monitoring Type | - Select - ▼ | |
| Criteria | | |
| WorkList | | Market | Australia ▼ |
| Month | | Acquisition Group | |
| From Month | May ▼ 2006 ▼ | To Month | April ▼ 2006 ▼ |

| Market: Australia | | | | | | | Overdue errors | | | | May 2006 - June 2006 | |
|---|---|---|---|---|---|---|---|
| Acquisition Channel | Signing Id | SE Number | SE Name | Date Setup | CheckList ID * | Assigned To | Due Date | Days Overdue |
| Want to Honour (Non-Bank ESA) | 2390723 | 9791234563 | Smith & Co | 4/14/2005 | 1 | WM | 5/14/2005 | 5 |
| Want to Honour (Non-Bank ESA) | 8966589 | 9792453321 | Boeing Pty Ltd | 4/20/2005 | 3 | WM | 5/20/2005 | 7 |
| Want to Honour (Non-Bank ESA) | 5678578 | 9792431231 | Ballon Live Ltd | 4/21/2005 | 2 | New | 5/21/2005 | 0 |
| Want to Honour (Non-Bank ESA) | 5678578 | 9792431231 | Ballon Live Ltd | 4/21/2005 | 3 | New | 5/21/2005 | 2 |
| ESAs (Non-Bank ESA) | 6563543 | 9239021311 | Tabster Pty Ltd | 4/2/2005 | 1 | WM | 5/2/2005 | 0 |
| ESAs (Non-Bank ESA) | 6563543 | 9239021311 | Tabster Pty Ltd | 4/2/2005 | 3 | New | 5/2/2005 | 9 |
| ESAs (Non-Bank ESA) | 5678578 | 3543524321 | Cordo Pty Ltd | 4/9/2005 | 2 | RM | 5/9/2005 | 4 |
| ESAs (Non-Bank ESA) | 8966589 | 2346356431 | Foldress Ltd | 4/11/2005 | 3 | New | 5/11/2005 | 0 |

* 1 - High Risk Industry
2 - Discount rate
3 - Prohibited Industry

Export to Excelsheet | Print | Close

Figure 8

SYSTEM AND METHOD FOR MONITORING ACQUISITION CHANNELS

FIELD OF THE INVENTION

The present invention generally relates to monitoring merchant acquisition channels to ensure compliance with internal and external laws, rules, and regulations, and more particularly, to a system and method for randomly selecting acquisition data for review, and notifying the appropriate party who is responsible for correcting any problems.

BACKGROUND OF THE INVENTION

Because a transaction account issuer's profit is primarily driven by the use of their product, an important objective for such companies is to persuade businesses and organizations to accept the transaction account issuer's product for payment of goods and services. Therefore, competition amongst transaction account issuers intensifies as new issuers enter the market and as foreign issuers expand globally. However, with the growing occurrences of identity theft, money laundering, and other types of credit related fraud, governments and the issuers themselves have implemented a number of regulations and controls. These regulations and controls are aimed at reducing such fraud by more carefully issuing and monitoring transaction account use. Moreover, those organizations and businesses desiring to accept a transaction account number as payment are often allowed to do so only under careful scrutiny to ensure their legitimacy. Transaction account issuers, therefore, adhere to both governmental and internal controls when authorizing an organization or business to accept their issued transaction account payment instruments (merchant acquisition).

Balancing the need to acquire merchants with preventing fraud includes transaction account issuers trying to win market share, while managing the risk of having their product used irresponsibly and/or fraudulently. Just as there are a set of rules governing the issuance of transaction accounts to consumers, there are likewise rules and procedures governing merchant acquisition. While some procedures may vary from one issuer to the next, many procedures are typically imposed by governmental entities such that the procedures must be adhered to by issuers within the particular country. However, in the global economy, laws and procedures vary from one country to the next country. As such, managing merchant acquisition to ensure that all of the internal and external rules and procedures are being adhered to is a labor intensive, yet vital process.

Transaction account issuers acquire merchants in various ways. For example, field representatives may physically visit a place of business to market their product to the merchant. Under this scenario, the field representative may be equipped with the appropriate paper forms and/or a personal computer loaded with electronic forms. The field representative may further have a checklist to help ensure the appropriate forms are completed during the acquisition process. Again, the acquisition process may vary from one merchant to the next depending on the nature of the business; therefore, the forms and/or procedures used to properly complete the forms may also vary.

A transaction account issuer may also acquire merchants by accepting a merchant application over the Internet. Regardless of the acquisition method, it is usually the transaction account issuer's responsibility to ensure that the proper rules and procedures are followed. For large transaction account issuers such as American Express Corporation, for example, merchant acquisition is closely monitored. As previously stated, this process can be a very time consuming and difficult task considering the large number of merchant applications and acquisition forms. Moreover, following up and ensuring that errors are corrected further adds to the complexity of the task. As such, a system is needed to electronically manage the complex compliance monitoring workflow in an accurate and timely manner. A need also exists for a system that randomly selects merchant acquisition data for a compliance review, notifies the appropriate personnel when it is time to perform a task, and ensures that the task is sufficiently completed.

SUMMARY OF THE INVENTION

The present invention provides for random verification of merchant acquisition data. The system enables an administrator to create a merchant selection query based on merchant selection criteria. The administrator may further create a checklist with checklist items. In one embodiment, each checklist item corresponds to a desk instruction that may be used to identify a non compliant data element within a merchant acquisition form.

The system executes the merchant selection query against a database of merchant acquisition forms to retrieve a random merchant set. The system retrieves a checklist that corresponds to the merchant set and packages the merchant set and checklist into a worklist. The worklist is assigned to a representative who then uses the checklist to determine compliance among each merchant acquisition form in the merchant set. When an error is identified, the representative assesses the error to determine whether the error can be corrected by the representative, or should be assigned to an appropriate acquisition manager for correction. When errors are corrected, the system closes the case and removes it from the workflow.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

DETAILED DESCRIPTION OF EXEMPLARY EMBODIMENTS

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Figure 1:
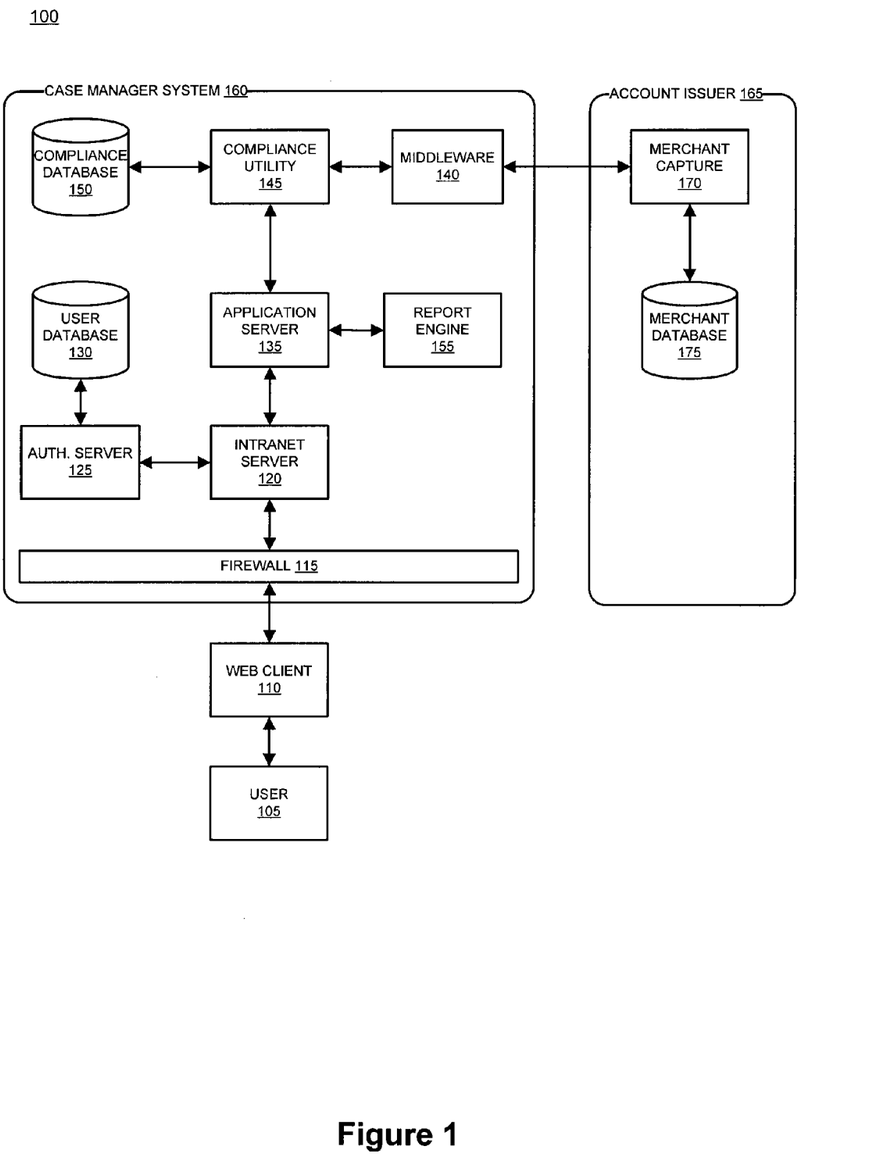
FIG. 1 is an overview of an exemplary system for monitoring acquisition channels to ensure compliance with rules and regulations, in accordance with various embodiments of the present invention.

With reference to FIG. 1, in one embodiment, the system includes a user 105 interfacing with a case manager system 160 by way of a web client 110. Transmissions between user 105 and intranet server 120 may pass through a firewall 115 to help to ensure the integrity of case manager system 160 components. Practitioners will appreciate that the invention may incorporate any number of security schemes or none at all. In one embodiment, intranet server 120 receives page requests from web client 110 and interacts with various other case manager system 160 components to perform tasks related to requests from web client 110. Intranet server 120 may invoke an authentication server 125 to verify the identity of user 105 and assign specific access rights to user 105. Authentication database 130 may store information used in the authentication process such as, for example, user identifiers, passwords, access privileges, user preferences, user statistics, and the like. When a request to access case manager system 160 is received from intranet server 120, internet server determines if authentication is required and transmits a prompt to web client 110. User 105 enters authentication data at web client 110, which transmits the authentication data to intranet server 120. Intranet server 120 passes the authentication data to authentication server which queries user database 130 for corresponding credentials. When user 105 is authenticated, user 105 may access Compliance Utility 145 for the purposes of configuration, reviewing monitoring data, viewing reports, and the like.

When user 105 is granted access to case manager system 160, Intranet server 120 may invoke an application server 135. Application server 135 invokes Compliance Utility 145 by passing parameters relating to user 105 selection of an action from an interface provided at web client 110. Application server may further invoke a report engine based on data derived from compliance database 150, transaction account issuer 165, or any other component of system 100. A report may include, for example, a compliance report based on a monthly compliance check.

When invoked by application server 135, Compliance Utility 145 may construct a query to retrieve, modify, and/or store data in compliance database 150. Moreover, Compliance Utility 145 may interact with middleware 140 in order to exchange data with transaction account issuer 165. Practitioners will appreciate that middleware 140 enables communication among disparate systems, thus may not be necessary based on the platforms used in case manager system 160 and transaction account issuer 165. Moreover, Compliance Utility 145 may communicate directly with any of the systems at transaction account issuer 165 by way of web services and/or any other known technology.

Transaction account issuer 165 may include a merchant capture system 170 to facilitate setup and maintenance of merchant accounts. For example, a customer service representative may interact with merchant capture system 170 to establish a new merchant account based on information obtained by a field service representative. Thereafter, the merchant is recognized by other transaction account issuer systems when the merchant facilitates a point of sale transaction. Information relating to registered merchants may be stored in merchant database 175. Practitioners will appreciate that the system architecture for transaction account issuer 165 may significantly vary among different transaction account issuers; therefore, transaction account issuer 165 is presented for explanation only and does not limit the scope of the invention.

System 100 (or any of the other components described herein) may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: user database 130, compliance database 150, merchant database 175, and/or like data useful in the operation of system 100.

As will be appreciated by one of ordinary skill in the art, one or more of the components of system 100 may be embodied as a customization of an existing system, an add-on product, upgraded software, a stand alone system (e.g., kiosk), a distributed system, a method, a data processing system, a device for data processing, and/or a computer program product. Accordingly, individual system 100 components may take the form of an entirely software embodiment, an entirely hardware embodiment, or an embodiment combining aspects of both software and hardware. Furthermore, individual system 100 components may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The invention contemplates uses in association with loyalty, incentive or reward programs, web services, utility computing, pervasive and individualized computing, security and identity solutions, autonomic computing, commodity computing, mobility and wireless solutions, open source, biometrics, grid computing and/or mesh computing.

User 105 may include any individual, group of individuals, business, entity, government organization, software and/or hardware that interact with system 100 to monitor acquisition reports, review electronic documentation, provide and/or correct acquisition data, and the like. In one embodiment, user 105 may be a field representative for a transaction account issuer. User 105 may also be, for example, an administrator who interacts with system 100 to create a checklist, create desk instructions, create merchant selection criteria, create a merchant set, and the like. As will be described in greater detail herein, user 105 may further be worklist manager, a relationship manager, administration, reports user, and the like. In one embodiment, user 105 may interact with case manager system 160 via an Internet browser at a web client 110.

Web client 110 comprises any hardware and/or software suitably configured to facilitate input, receipt and/or review of information relating to merchant acquisition or any information discussed herein. Web client 110 includes any device (e.g., personal computer), which communicates (in any manner discussed herein) with case manager system 160 via any network discussed herein. Such browser applications comprise Internet browsing software installed within a computing unit or system to conduct online transactions and communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that web client 110 may or may not be in direct contact with case manager system 160. For example, web client 110 may access the services of case manager system 160 through another server, which may have a direct or indirect connection to intranet server 120.

As those skilled in the art will appreciate, web client 110 includes an operating system (e.g., Windows NT, 95/98/2000, OS2, UNIX, Linux, Solaris, MacOS, etc.) as well as various conventional support software and drivers typically associated with computers. Web client 110 may include any suitable personal computer, network computer, workstation, minicomputer, mainframe or the like. Web client 110 can be in a home or business environment with access to a network. In an exemplary embodiment, access is through a network or the Internet through a commercially available web-browser software package.

Web client 110 may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network.

Firewall 115, as used herein, may comprise any hardware and/or software suitably configured to protect case manager system 160 components from users of other networks. Firewall 115 may reside in varying configurations including stateful inspection, proxy based and packet filtering, among others. Firewall 115 may be integrated as software within Intranet server 120, any other system components, or may reside within another computing device or may take the form of a standalone hardware component.

Intranet server 120 may include any hardware and/or software suitably configured to facilitate communications between web client 110 and one or more case manager system 160 components. Further, intranet server 120 may be configured to transmit data to web client 110 within markup language documents. As used herein, "data" may include encompassing information such as commands, queries, files, data for storage, and/or the like in digital or any other form. Intranet server 120 may operate as a single entity in a single geographic location or as separate computing components located together or in separate geographic locations.

Intranet server 120 may provide a suitable web site or other Internet-based graphical user interface, which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a web site having web pages. The term "web page" as it is used herein is not meant to limit the type of documents and applications that might be used to interact with the user. For example, a typical web site might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and/or the like. A server may include a web service that receives a request from a web server, the request including a URL (http://yahoo.com/stockquotes/ge) and an IP address (123.56.789). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003), hereby incorporated by reference.

Application server 135 may include any hardware and/or software suitably configured to serve applications and data to a connected web client 110. Like intranet server 120, application server 135 may communicate with any number of other servers, databases and/or components through any means known in the art. Further, application server 135 may serve as a conduit between web client 110 and the various systems and components of the case manager system 160. Intranet server 120 may interface with application server 135 through any means known in the art including a LAN/WAN, for example. Application server 135 may further invoke Compliance Utility 145 in response to user 105 requests.

Compliance Utility 145 may include any hardware and/or software suitably configured to receive requests from web client 110 via Intranet server 120 and application server 135. Compliance Utility 145 is further configured to process requests, construct database queries, execute queries against compliance database 150, and/or exchange data with transaction account issuer 165 via middleware 140. In one embodiment, Compliance Utility 145 may be configured to interact with other case manager system 160 components to perform complex calculations, retrieve additional data, format data into reports, create XML representations of data, construct markup language documents, and/or the like. Moreover, Compliance Utility 145 may reside as a standalone system or may be incorporated within application server 135 or any other case manager system 160 component as program code.

The case manager system 160 and the transaction account issuer 160 may be interconnected via middleware 140. Middleware 140 may include any hardware and/or software suitably configured to facilitate communications and/or process transactions between disparate computing systems. Middleware components are commercially available and known in the art. Middleware 140 may be implemented through commercially available hardware and/or software, through custom hardware and/or software components, or through a combination thereof. Middleware 140 may reside in a variety of configurations and may exist as a standalone system or may be a software component residing on the intranet server 120. Middleware 140 may be configured to process transactions between the various components of case manager system 160 and any number of internal or external issuer systems 100 for the purposes disclosed herein. In one embodiment, middleware 140 may comprise web services that are invoked to exchange data between the various disclosed systems.

Case manager system 160 further includes a report engine 155. Report engine 155 includes any hardware and/or software suitably configured to produce reports from information stored in one or more databases. Report engines are commercially available and known in the art. Report engine 155 provides, for example, printed reports, web access to reports, graphs, real-time information, raw data, batch information and/or the like. Report engine 155 may be implemented through commercially available hardware and/or software, through custom hardware and/or software components, or through a combination thereof. Further, report engine 155 may reside as a standalone system within case manager system 160 or as a component of intranet server 120.

In order to control access to application server 135 or any other component of merchant system, intranet server 120 may invoke an authentication server 125 in response to user 105 submissions of authentication credentials received at intranet server 120. Authentication server 125 may include any hardware and/or software suitably configured to receive authentication credentials, encrypt and decrypt credentials, authenticate credentials, and/or grant access rights according to pre-defined privileges attached to the credentials. Authentication server 125 may grant varying degrees of application and data level access to users based on information stored within user database 130.

User database 130 may include any hardware and/or software suitably configured to facilitate storing identification, authentication credentials, and/or user permissions. compliance database 150 stores data relating to checklists, desk instructions, merchant selection criteria, worklists, merchant sets, industry risk assessments, cases, workflows, audit trails, and the like. One skilled in the art will appreciate that case manager system 160 may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression; SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the system by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of system 100, the data can be stored without regard to a common format.

However, in one exemplary embodiment of the invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. System 100 contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of system 100 may consist of any combination thereof at a single location or at multiple locations, wherein each database or system includes any of various suitable security features, such as firewalls, access codes, encryption, decryption, compression, decompression, and/or the like.

The invention may be described herein in terms of functional block components, screen shots, optional selections and various processing steps. It should be appreciated that such functional blocks may be realized by any number of hardware and/or software components configured to perform the specified functions. For example, system 100 may employ various integrated circuit components, e.g., memory elements, processing elements, logic elements, look-up tables, and/or the like, which may carry out a variety of functions under the control of one or more microprocessors or other control devices. Similarly, the software elements of system 100 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that system 100 may employ any number of conventional techniques for data transmission, signaling, data processing, network control, and/or the like. Still further, system 100 could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

As used herein, "transaction" or similar terms may include any exchange of a monetary or other value for items. Specifically, with regard to the present invention, a transaction takes place when a holder of a transaction account provides an account code to a service establishment in order to facilitate a transfer of funds from the transaction account to the service establishment. A service establishment may comprise any merchant of goods, services, information and/or other items.

An "account", "account number" or "account code", as used herein, may include any device, code, number, letter, symbol, digital certificate, smart chip, digital signal, analog signal, biometric or other identifier/indicia suitably configured to allow the consumer to access, interact with or communicate with the system (e.g., one or more of an authorization/access code, personal identification number (PIN), Internet code, other identification code, and/or the like). The account number may optionally be located on or associated with a rewards card, transaction account, credit card, debit card, prepaid card, telephone card, embossed card, smart card, magnetic stripe card, bar code card, transponder, radio frequency card or an associated account. The system may include or interface with any of the foregoing cards or devices, or a fob having a transponder and RFID reader in RF communication with the fob. Although the system may include a fob embodiment, the invention is not to be so limited. Indeed, system may include any device having a transponder which is configured to communicate with RFID reader via RF communication. Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

The account number may be distributed and stored in any form of plastic, electronic, magnetic, radio frequency, wireless, audio and/or optical device capable of transmitting or downloading data from itself to a second device. A consumer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type, etc. In this example, the last (sixteenth) digit is used as a sum check for the sixteen-digit number. The intermediary eight-to-ten digits are used to uniquely identify the consumer. A merchant account number may be, for example, any number or alpha-numeric characters that identify a particular merchant for purposes of card acceptance, account reconciliation, reporting, or the like.

Referencing the computer networked aspect of an exemplary embodiment of this invention; each participant is equipped with a computing system to facilitate online commerce transactions. The computing units may be connected with each other via a data communication network. The network is a public network and assumed to be insecure and open to eavesdroppers. In the illustrated implementation, the network is embodied as the internet. In this context, the computers may or may not be connected to the internet at all times. For instance, the cardholder computer may employ a modem to occasionally connect to the internet, whereas the card provider computing center might maintain a permanent connection to the internet. It is noted that the network may be implemented as other types of networks, such as an interactive television (ITV) network.

Practitioners will appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

Figure 2A:
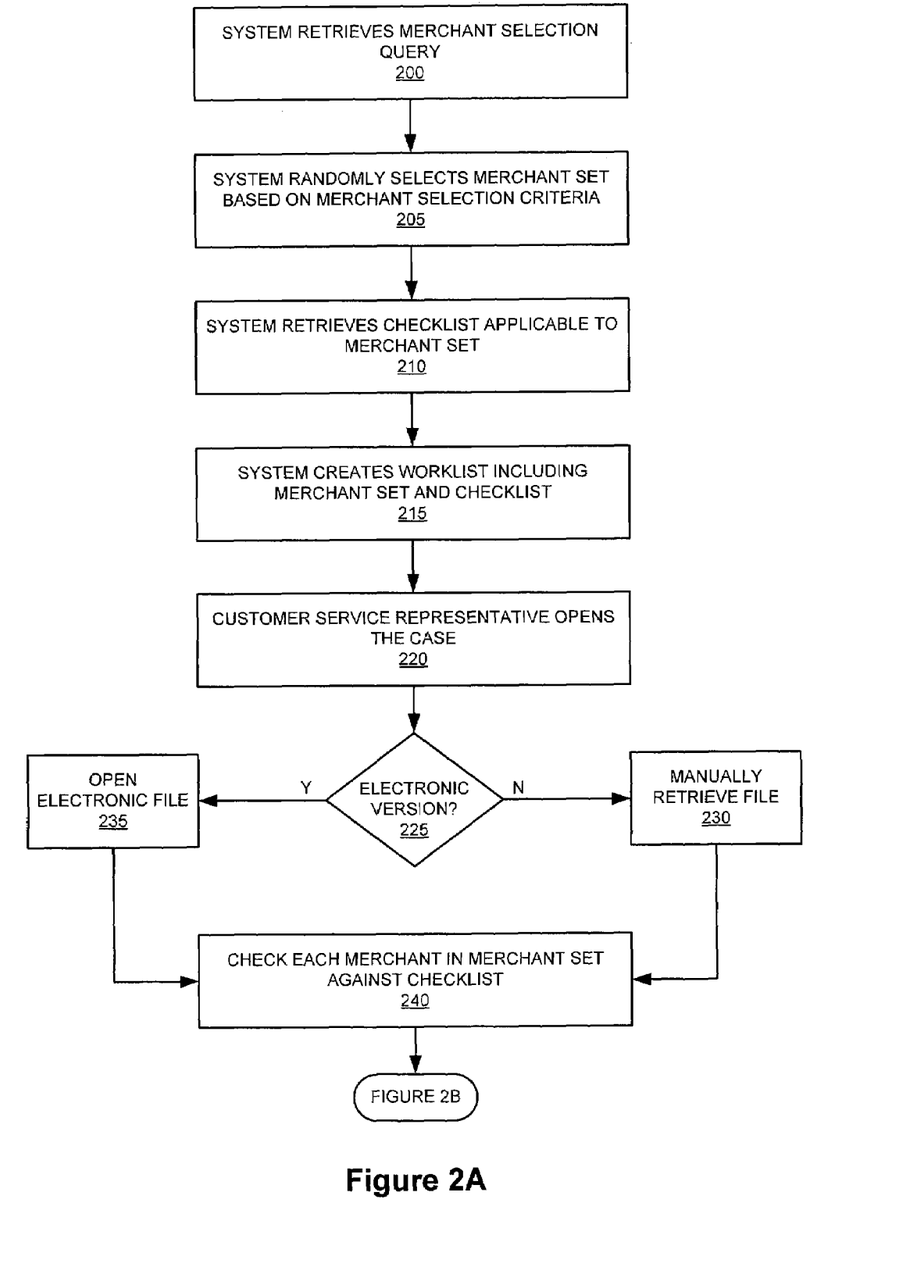
FIG. 2A-2B is a process flow diagram showing an exemplary process for facilitating a random verification of merchant acquisition data to identify and rectify errors, in accordance with various embodiments of the present invention.

With reference to FIG. 2A, an acquisition channel monitoring process may be automatically invoked at defined periods or randomly. In one embodiment, the monitoring process is invoked manually by user 105 interfacing with case manager system 160 by way of web client 110. Compliance Utility 145 retrieves merchant selection query from compliance database (step 200). Merchant selection criteria may be configured by an administrator and include, for example, a Service Establishment (SE) number, SE name, SE status, setup date, signing representative identifier, acquisition group, signing reason, industry code, market, percentage of merchants, and number of merchants. The merchant selection criteria are used to construct a merchant selection query that may be named and saved to compliance database 150. User 105 may delete the merchant selection query, or modify it and save it as a new merchant selection query.

Compliance Utility 145 uses the retrieved merchant selection criteria to randomly select a merchant set from a pool of merchants that meets the criteria defined in the merchant selection query (step 205). Although the same merchant selection query may be used a number of times, in one embodiment, the selection criteria is modified to create a truly random sampling of merchants. The random sampling helps to ensure that each merchant from the merchant pool has an equal probability of being selected.

Compliance Utility 145 retrieves a checklist that is applicable to the merchant set (step 210). Because the acquisition process may vary from merchant to merchant, and from country to country, a number of checklists may be configured in accordance with the merchant set. A checklist includes a plurality of items, and each item may have an associated desk instruction. A desk instruction provides further information relating to the checklist item such as, for example, information pertaining whether a specific form field is required or optional. Checklist items and desk instructions may be named and saved to compliance database 150 and later used as a template, for example, to create new checklist items and desk instructions.

Figure 3:
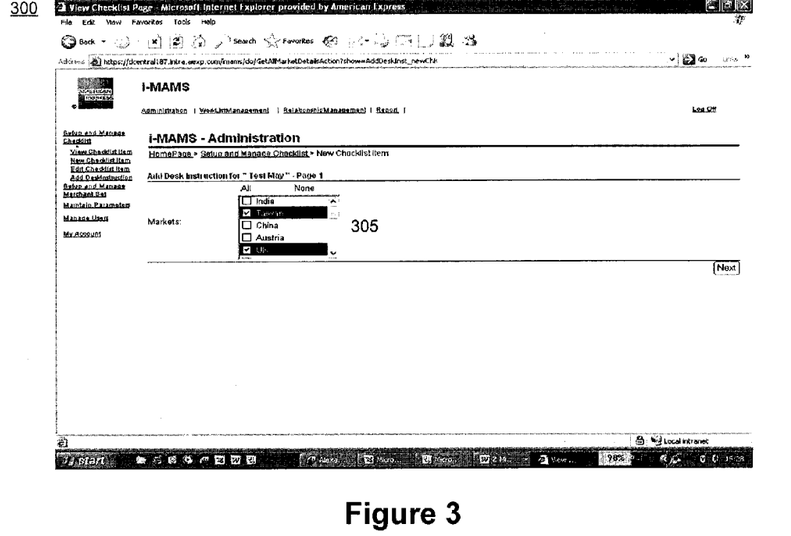
FIG. 3 is a screenshot of an exemplary interface for defining desk instructions and associating the desk instructions with a market, in accordance with various embodiments of the present invention.

With reference to FIG. 3, once created, a desk instruction may be associated with specific markets. As previously discussed, individual markets may have their own unique sets of requirements due to variances in the laws and regulations of the market. Therefore, desk instructions may also vary based on the checklist items in which they are associated. When a desk instruction is defined, user 105 may select the appropriate markets 305 to make the desk instruction applicable within that market.

Figure 4:
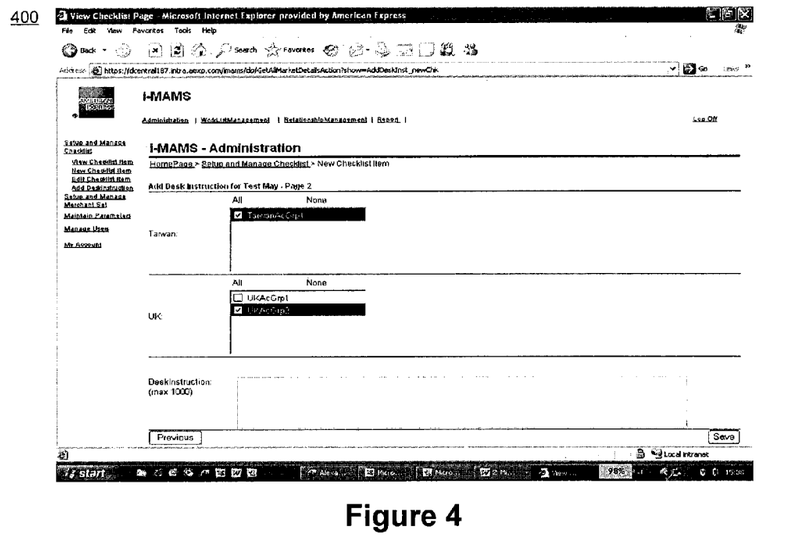
FIG. 4 is a screenshot of an exemplary interface for associating desk instructions with groups within a selected market, in accordance with various embodiments of the present invention.

With reference to FIG. 4, an individual market may have a plurality of market groups. For example, while the same laws and regulations may apply to a market as a whole, the administrator may determine that certain regions of the market include a higher risk. Therefore, the standards for merchant acquisition within high-risk groups may be more stringent than those of other regions or groups within the market. For example, a transaction account issuer may experience a higher than average number of fraudulent Internet transactions among merchants in a single city in Nigeria. As such, the transaction account issuer may designate a first group comprising merchants within the identified city, and a second group comprising all other cities in Nigeria.

Figure 5:
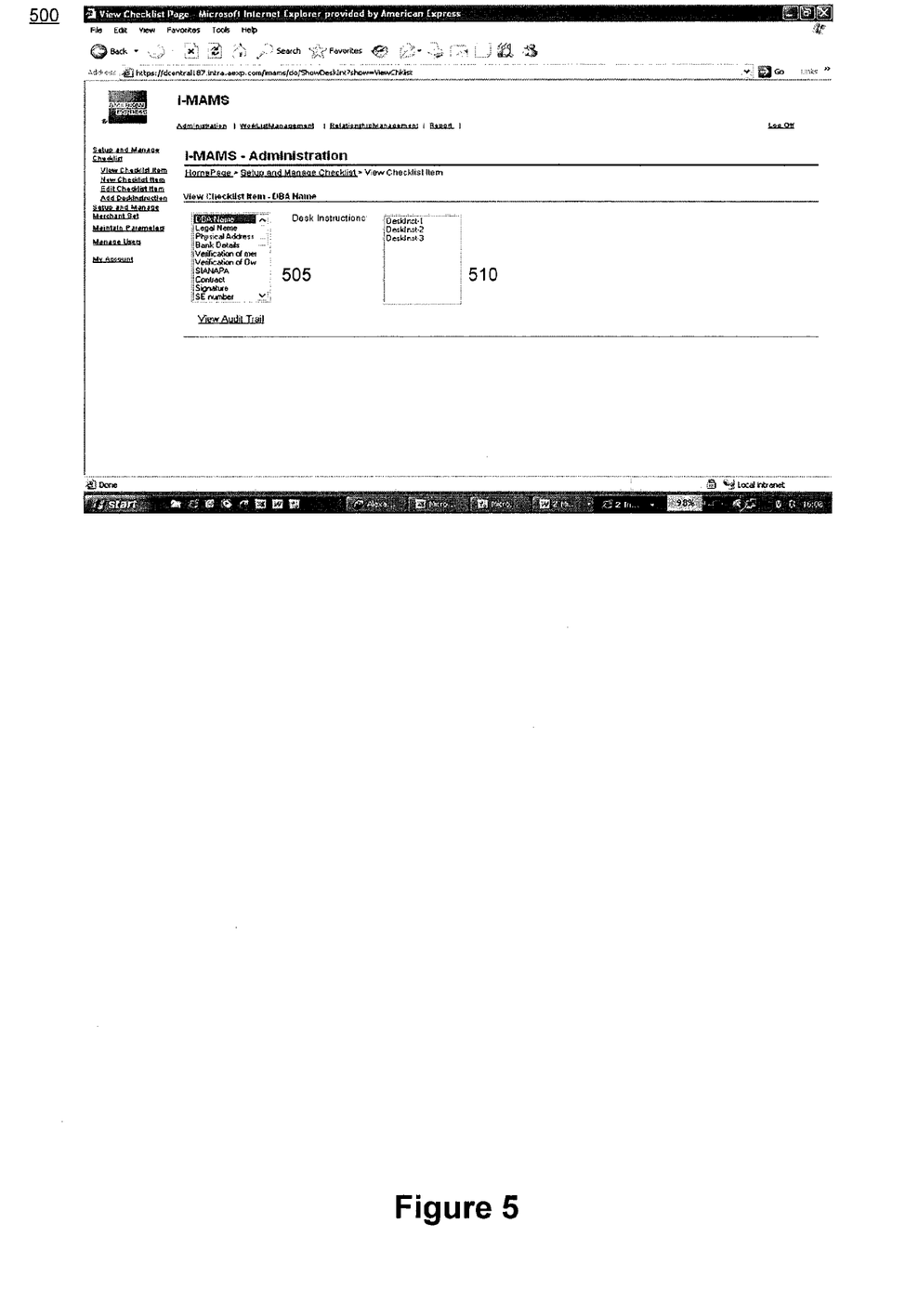
FIG. 5 is a screenshot of an exemplary interface for associating desk instructions with checklist items, in accordance with various embodiments of the present invention.
Figure 6:
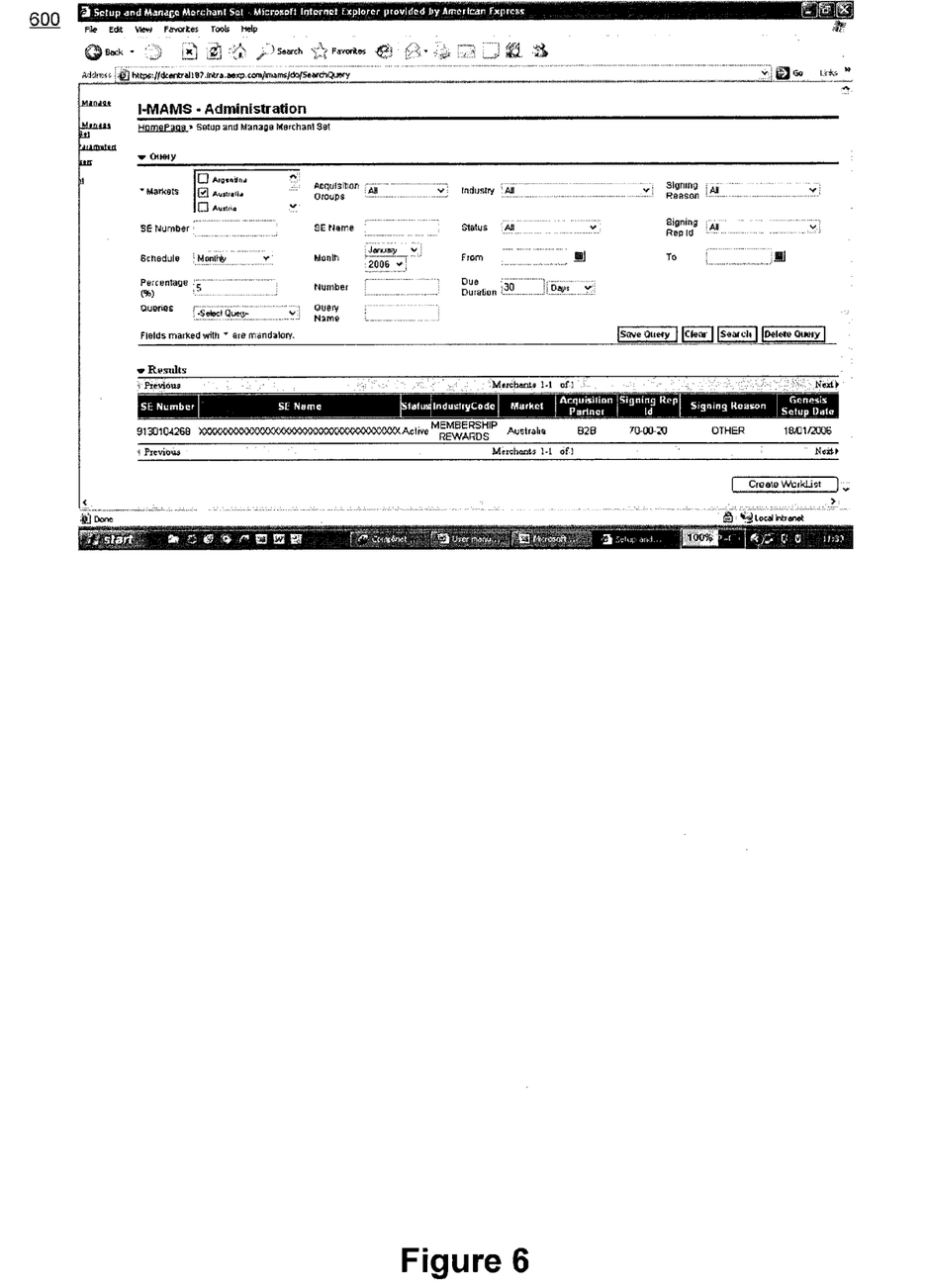
FIG. 6 is a screenshot of an exemplary interface for defining merchant selection criteria for compiling a merchant set, in accordance with various embodiments of the present invention.

Referring to FIG. 5, an interface 500 is provided that may be used to view the checklist items and their associated desk instruction. As previously described, a checklist item may be associated with one or more desk instructions. By selecting a checklist item 505, Compliance Utility 145 queries compliance database to retrieve the associated desk instructions for display 510. While not shown, the interface 500 may further enable the administrator to create new associations, modify existing associations, and delete associations.

Referring again to FIG. 2A, the merchant set and the corresponding checklist are combined to create a worklist (step 220). The worklist comprises the merchant set with checklist items assigned to each merchant within the merchant set, which is referred to herein as a "case." A customer service representative, or other designated entity, opens the case (step 220) to begin a check of a merchant acquisition form. If an electronic version of the merchant acquisition forms is available (step 225), then the electronic file is opened (step 235). If an electronic version is not available, then the customer service representative manually retrieves the physical file (step 230). Because various methods for acquiring merchants may be employed, an electronic version of the acquisition documentation may not always be available.

Figure 2B:
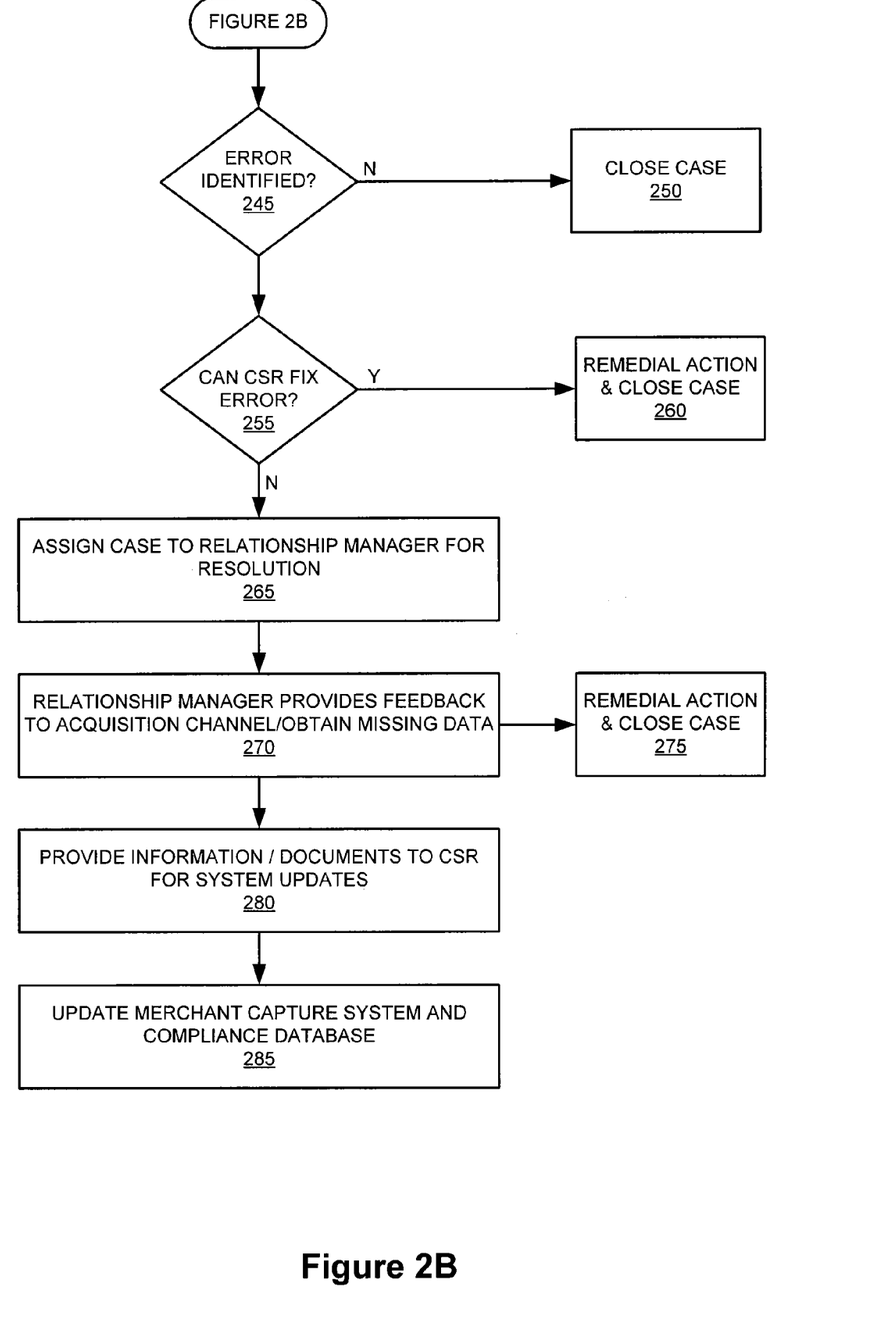

The customer service representative checks data relating to each merchant in the merchant set against each checklist item to determine when data is missing and/or is incorrect (step 240). If no errors are identified among merchants in the merchant set (step 245), then the case is closed (step 245). However, if errors are identified, then a determination is made as to whether the errors are of a nature that can be rectified by the customer service representative (step 255). For instance, some errors may be minor in nature (e.g., a missing telephone number), that they may be easily fixed by the customer service representative without requiring additional help. If an error can be rectified by the customer service representative, the remedial action is taken and the case is closed (step 260). Otherwise, the customer service representative assigns the case to a relationship manager, or other designated entity, for resolution (step 265). Such errors may include, for example, not completing the proper form, missing vital information, failing to obtain a merchant signature, and the like. When errors are assigned for resolution, Compliance Utility 145 automatically generates an email addressed to the assignee, which includes a description of the error as well as, for example, an expected completion date for correction and any other instructions. Compliance Utility 145 further adds a record of the error to compliance database 150, such that it can be reported and progress monitored.

In one embodiment, the checklist items may be initially grouped into a worklist and assigned to a worklist management team to be resolved. The worklist management team and the relationship manager are then able to manage cases, enabling each checklist item to be marked as either "failed" or "passed." When each of the checklist items are marked as passed, then Compliance Utility 145 automatically closes the case.

The relationship manager to which the case is assigned is preferably the relationship manager for the acquisition channel that facilitated the error; however, such an assignment is not required. The relationship manager provides feedback to the acquisition channel, and if data is missing, obtains the missing data (step 27). Feedback from the acquisition manager is intended to educate the acquisition channel in order to prevent such errors in the future. When the relationship manager provides feedback and obtains any missing data, remedial action is taken and the case is closed (step 275). The relationship manager further provides resolution information and/or corrected documents to the customer service representative who performs an update to the appropriate systems (step 280). Finally, the customer service representative updates the merchant capture system and Compliance Utility with the corrected information (step 285).

While the steps described in regard to FIGS. 2A and 2B may comprise both automated and manual processes, practitioners will appreciate that other configurations may be contemplated without departing from the scope of the invention. For instance, the steps of identifying errors (step 245) may be performed by Compliance Utility 145 through the inclusion Optical Character Recognition (OCR), pattern matching, artificial intelligence, and like technologies. Moreover, the decisioning steps may be performed through a rules based system using scores and weighting schemes to determine the severity of an error and route the case to the appropriate individual or system 100 component for correction.

Figure 7:
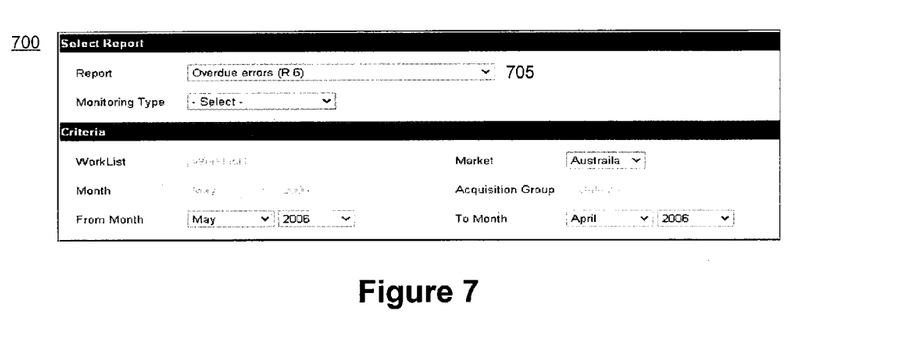
FIG. 7 is a screenshot of an exemplary interface for configuring a report, in accordance with various embodiments of the present invention; and, FIG. 8 is a screenshot of an exemplary report interface showing overdue error resolution, in accordance with various embodiments of the present invention.
Figure 8:
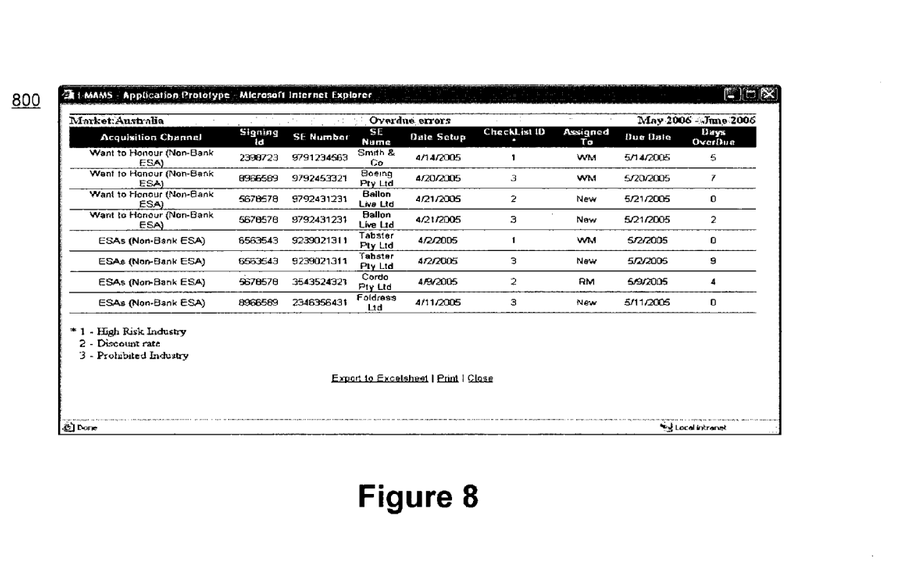

To ensure that identified merchant acquisition errors are resolved, an interface is provided to enable user 105 to generate reports based on a number of parameters. Referring to FIG. 7, a report interface 700 enables user 105 to select a report type 705 and various parameters including, for example, monitoring type, work list, market, month, acquisition group, from month, and to month. Upon selecting a report type and any optional parameters, report engine 155 queries compliance database 150 to retrieve records matching the selected parameters, format the data into an organized report, and present the report to user 105 within a results interface. A results interface is illustrated in FIG. 8, which identifies, for example, a number of unresolved errors, the acquisition channels responsible for each error, and the identity of users who each error is assigned to for resolution.

While the steps outlined above represent a specific embodiment of the invention, practitioners will appreciate that there are any number of computing algorithms and user interfaces that may be applied to create similar results. The steps are presented for the sake of explanation only and are not intended to limit the scope of the invention in any way.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above. Reference to an element in the singular is not intended to mean "one and only one" unless explicitly so stated, but rather "one or more." Moreover, where a phrase similar to at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

We claim:

1. A method for determining compliance within a merchant account setup, said method comprising:

receiving, at a computer, merchant selection criteria;

selecting, by said computer, a merchant set of merchant acquisition forms having merchant data based on said merchant selection criteria;

retrieving, by said computer, one of said merchant acquisition forms from said merchant set, said one of said merchant acquisition forms having a plurality of fields;

retrieving, by said computer, merchant data from said plurality of fields of said one of said merchant acquisition forms, wherein said merchant data includes merchant setup information;

retrieving, by said computer, compliance checklist items corresponding to said merchant data, wherein said compliance checklist items are previously established;

comparing, by said computer, said compliance checklist items to corresponding said merchant account setup information;

identifying, by said computer, non-compliant data in said merchant account setup information based on said comparison;

compiling, by said computer, said non-compliant data; and creating, by said computer, a compliance report based on said compilation of said non-compliant data, wherein said compliance report includes said non-compliant data associated with said merchant account setup.

2. The method of claim 1, further comprising opening a case when said merchant data includes said non-compliant data.

3. The method of claim 1, further comprising opening a case when said merchant data includes said non-compliant data and assigning said case to a relationship manager for resolution.

4. The method of claim 2, further comprising assigning said case to a relationship manager when said non-compliant data exceeds a predetermined threshold.

5. The method of claim 1, further comprising correcting said non-compliant data.

6. The method of claim 1, further comprising notifying a relationship manager when said non-compliant data includes data missing from said merchant data, wherein said relationship manager performs an analysis of said merchant data.

7. The method of claim 1, further comprising creating an audit report based on resolution of said non-compliant data, wherein said audit report includes at least one of: a said compliance checklist item, market, acquisition group, and signing representative identifier.

8. The method of claim 1, further comprising randomly retrieving a subset of said merchant data.

9. The method of claim 1, wherein each of said compliance checklist items includes a corresponding expected outcome instruction.

10. The method of claim 1, wherein said merchant selection criteria includes at least one of: an industry type identifier, a geographical area identifier, market, industry, partner, acquisition channel, and sales representative.

11. The method of claim 1, wherein said merchant setup information is obtained from a merchant setup form and includes at least one of: a Service Establishment (SE) number, SE name, SE status, setup date, signing representative identifier, acquisition group, signing reason, industry code, market, percentage of merchants, or number of merchants.

12. The method of claim 1, wherein said computer comprises a case manager system.

13. The method of claim 1, wherein said computer comprises at least one of a compliance database, compliance utility, middleware, user database, application server, report engine, authorization server, internet server and firewall.

14. A case manager system for determining compliance within a merchant account setup, said compliance system configured to:

receive, at said compliance system, merchant selection criteria;

select a merchant set of merchant acquisition forms having merchant data based on said merchant selection criteria;

retrieve one of said merchant acquisition forms from said merchant set, said one of said merchant acquisition forms having a plurality of fields;

retrieve said plurality of fields of said one of said merchant acquisition forms, wherein said merchant data includes merchant setup information;

retrieve compliance checklist items corresponding to said merchant data, wherein said compliance checklist items are previously established;

compare said compliance checklist items to corresponding said merchant account setup information;

identify non-compliant data in said merchant account setup information based on said comparison;

compile said non-compliant data; and create a compliance report based on said compilation of said non-compliant data, wherein said compliance report includes said non-compliant data associated with said merchant account setup.

15. The system of claim 14, wherein said case manager system opens a case when said merchant data includes said non-compliant data.

16. The system of claim 14, wherein said case manager system opens a case when said merchant data includes said non-compliant data and assigns said case to a relationship manager for resolution.

17. The system of claim 14, wherein said case manager system assigns said case to a relationship manager when said non-compliant data exceeds a predetermined threshold.

18. The system of claim 14, wherein said case manager system corrects said non-compliant data.

19. The system of claim 14, wherein said case manager system notifies a relationship manager when said non-compliant data includes data missing from said merchant data, wherein said relationship manager performs an analysis of said merchant data.

20. The system of claim 14, wherein said case manager system creates an audit report based on resolution of said non-compliant data, wherein said audit report includes at least one of: a said compliance checklist item, instruction set, market, acquisition group, and signing representative identifier.

21. The system of claim 14, wherein said case manager system randomly retrieving a subset of said merchant data.

22. The system of claim 14, wherein each of said compliance checklist items includes a corresponding expected outcome instruction.

23. The system of claim 14, wherein said merchant selection criteria includes at least one of: an industry risk type, a geographical area identifier, market, industry, partner, acquisition channel, and sales representative.

24. The system of claim 14, wherein said case manager system comprises at least one of a compliance database, compliance utility, middleware, user database, application server, report engine, authorization server, internet server and firewall.

25. A computer readable medium tangibly embodying a plurality of instructions, when executed by a computer, cause said computer to perform a method comprising:

receiving, at said computer, merchant selection criteria;

selecting, by said computer, a merchant set of merchant acquisition forms having merchant data based on said merchant selection criteria;

retrieving, by said computer, one of said merchant acquisition forms from said merchant set, said one of said merchant acquisition forms having a plurality of fields;

retrieving, by said computer, merchant data from said plurality of fields of said one of said merchant acquisition forms, wherein said merchant data includes merchant setup information;

retrieving, by said computer, compliance checklist items corresponding to said merchant data, wherein said compliance checklist items are previously established;

comparing, by said computer, said compliance checklist items to corresponding said merchant account setup information;

identifying, by said computer, non-compliant data in said merchant account setup information based on said comparison;

compiling, by said computer, said non-compliant data; and creating, by said computer, a compliance report based on said compilation of said non-compliant data, wherein said compliance report includes said non-compliant data associated with said merchant account setup.

* * * * *